(12) United States Patent
Betancourt

(10) Patent No.: US 11,472,243 B1
(45) Date of Patent: Oct. 18, 2022

(54) BOAT TRAILER EXTENDER

(71) Applicant: Omar Perfecto Betancourt, Miami, FL (US)

(72) Inventor: Omar Perfecto Betancourt, Miami, FL (US)

( * ) Notice: Subject to any disclaimer, the term of this patent is extended or adjusted under 35 U.S.C. 154(b) by 0 days.

(21) Appl. No.: 17/828,307

(22) Filed: May 31, 2022

(51) Int. Cl.
*B60P 3/10* (2006.01)
*B60D 1/40* (2006.01)

(52) U.S. Cl.
CPC ............ *B60D 1/40* (2013.01); *B60P 3/1083* (2013.01)

(58) Field of Classification Search
CPC ...... B60P 3/1083; B60D 1/155; B60D 1/1675
See application file for complete search history.

(56) References Cited

U.S. PATENT DOCUMENTS

| 3,428,336 | A | * | 2/1969 | Thurman | B60P 3/1083 280/491.2 |
|---|---|---|---|---|---|
| 3,989,266 | A | * | 11/1976 | Foster | B60P 3/1083 414/349 |
| 4,232,990 | A | * | 11/1980 | Pierce | B60P 3/1083 414/559 |
| 4,726,601 | A | * | 2/1988 | Stevens | B60P 3/1083 188/112 R |
| 5,011,177 | A | * | 4/1991 | Grice | B60D 1/40 280/491.2 |
| 5,114,168 | A | * | 5/1992 | Kehl | B60P 3/1083 114/344 |
| 5,895,066 | A | * | 4/1999 | Headlee | B60P 3/1083 280/491.5 |
| 2003/0132606 | A1 | * | 7/2003 | Eskridge | B60P 3/1083 280/491.2 |
| 2007/0227432 | A1 | * | 10/2007 | Imbergamo | B60P 3/1083 114/242 |
| 2008/0258428 | A1 | * | 10/2008 | Lane | B60P 3/1083 280/414.1 |
| 2015/0224908 | A1 | * | 8/2015 | Colvin | B60D 1/06 280/482 |

* cited by examiner

*Primary Examiner* — Kaitlin S Joerger
(74) *Attorney, Agent, or Firm* — Ruben Aloca, Esq.

(57) ABSTRACT

A boat trailer extender that comprises of a track bar that connects to a tow vehicle, a guide bar that mounts on the track bar, the guide bar is configured to receive a boat trailer, four horizonal and four vertical guide bar rollers that are used to stabilize the guide bar on the track bar, a winch that is used to move the guide bar, the winch uses a strap and a series of track guide rollers that form a strap loop, and a closed loop strap brake that is used to add tension to the strap as it is spooled onto a spool of the winch. The spool is a two-sided spool, a first side of the spool can release and retrieve the strap as the guide bar is moved on the track bar, and a second side of the spool can retrieve and release the strap as the guide bar is moved on the track bar.

3 Claims, 7 Drawing Sheets

BOAT TRAILER EXTENDER

CROSS REFERENCE

This application claims priority to and the benefit under 35 U.S.C. section.119(e) of U.S. Provisional Patent Application No. 63/241,598, filed on Sep. 8, 2021, the entire disclosure of which is hereby incorporated herein by reference.

BACKGROUND

The present invention is a boat trailer extender that is used to load and unload a boat trailer on a boat ramp.

Boat ramps typically have a slope that is between 7 degrees to a maximum 15 degrees. A vehicle loading or unloading a boat trailer on a boat ramp that is 12 degrees in slope will usually have its rear axle in the body of water. The greater the slope of the boat ramp, the harder it will be for small vehicles to get up the ramp when retrieving the loaded boat trailer.

The present invention provides a boat trailer extender that prevents the rear axle of a vehicle that is loading or unloading the boat trailer from touching water, thereby minimizing the chances that the vehicle that is loading or unloading the boat trailer will get stuck on the boat ramp.

The present invention is designed to allow the boat trailer to extend or retract from the boat trailer extender.

The present invention uses straps and a winch rather than gears to extend and retract a boat trailer from a boat trailer extender that is connected to a tow vehicle.

The loading and unloading of a boat trailer on a boat ramp is a dangerous operation, even for experienced boaters. The present invention is designed to provide boaters with a tool that will increase their chances of safely loading and unloading a boat on a boat ramp using the boat trailer extender of the present invention.

The boat trailer extender of the present invention provides boaters with a tool that will allow them to safely place and retrieve their boats from a body of water.

SUMMARY

The present invention is a boat trailer extender that is used to safely lower a boat trailer on a boat ramp when placing a boat on a body of water and when retracting the boat from the body of water.

The boat trailer extender comprises of a track bar that connects to a tow vehicle, a guide bar that mounts on the track bar, the guide bar is configured to receive a boat trailer, four horizonal and four vertical guide bar rollers that are used to stabilize the guide bar on the track bar, a winch that is used to move the guide bar, the winch uses a strap and a series of track guide rollers that form a strap loop, and a closed loop strap brake that is used to add tension to the strap as it is spooled onto a spool of the winch. The spool is a two-sided spool, a first side of the spool can release and retrieve the strap as the guide bar is moved on the track bar, and a second side of the spool can retrieve and release the strap as the guide bar is moved on the track bar.

An object of the present invention is to provide a boat trailer extender that will allow a small boat that is placed on a boat trailer to be safely released and retracted from a body of water that is adjacent to a boat ramp.

Another object of the present invention is to provide a boat trailer extender that will not corrode as quickly as other extenders in the market because of the plastic covered strap that it uses to load and unload a boat onto a body of water.

Another object of the present invention is to provide a boat trailer extender that will not oxidize as quickly as other extenders in the market because of the plastic covered strap that it uses to load and unload a boat onto a body of water.

DRAWINGS

These and other features, aspects, and advantages of the present invention will become better understood with regards to the following description, appended claims, and drawings where:

DESCRIPTION

Figure 1:
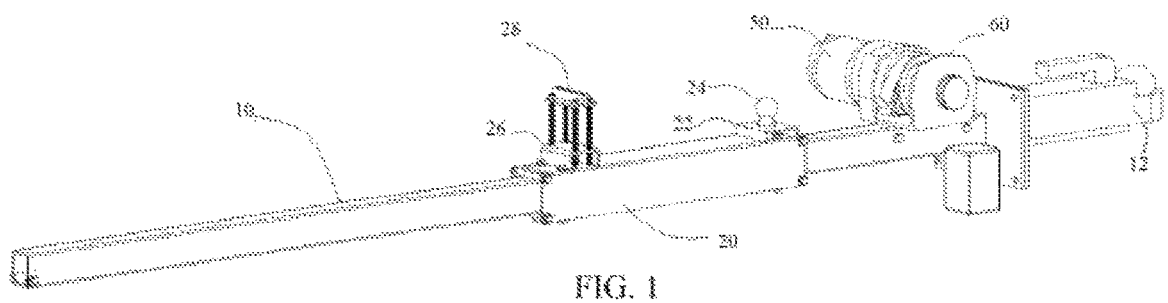
FIG. 1 shows a perspective view of the present invention in a retracted position.
Figure 2:
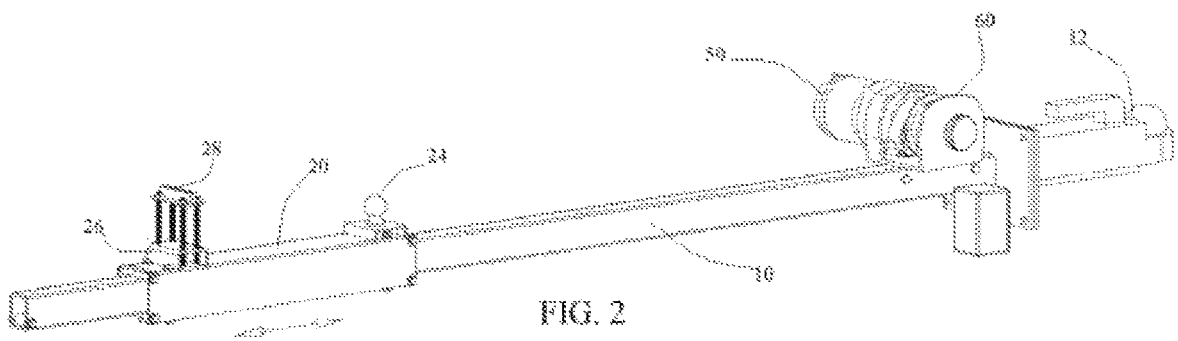
FIG. 2 shows a perspective view of the present invention in an extended position.
Figure 3:
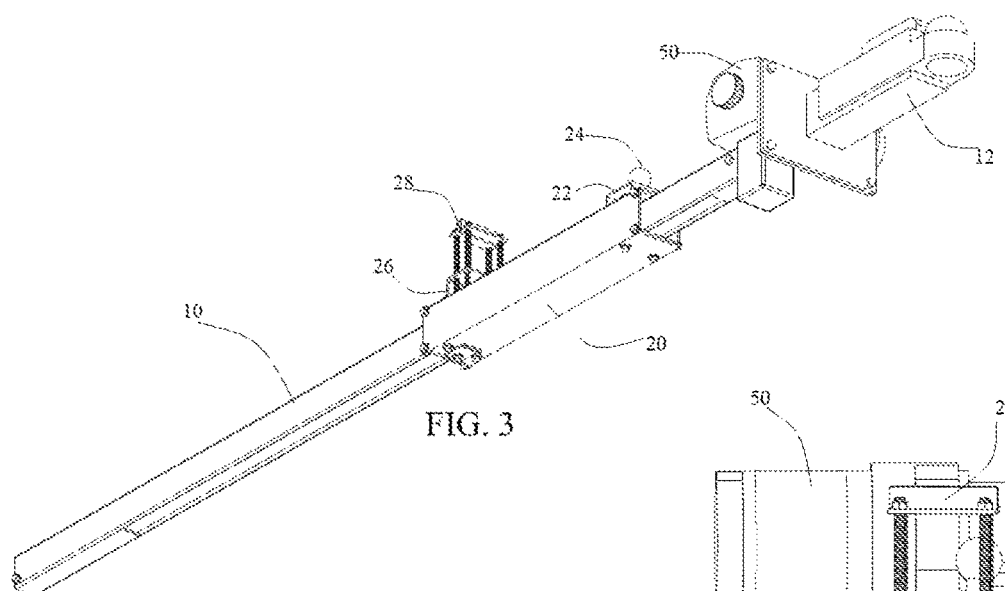
FIG. 3 shows a bottom perspective view of the present invention in the retracted position.
Figure 4:
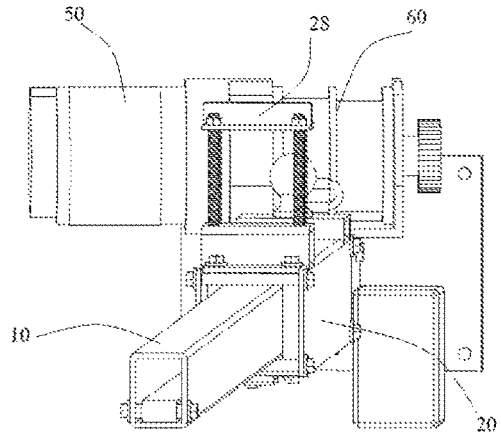
FIG. 4 shows a rear perspective view of the present invention.
Figure 5:
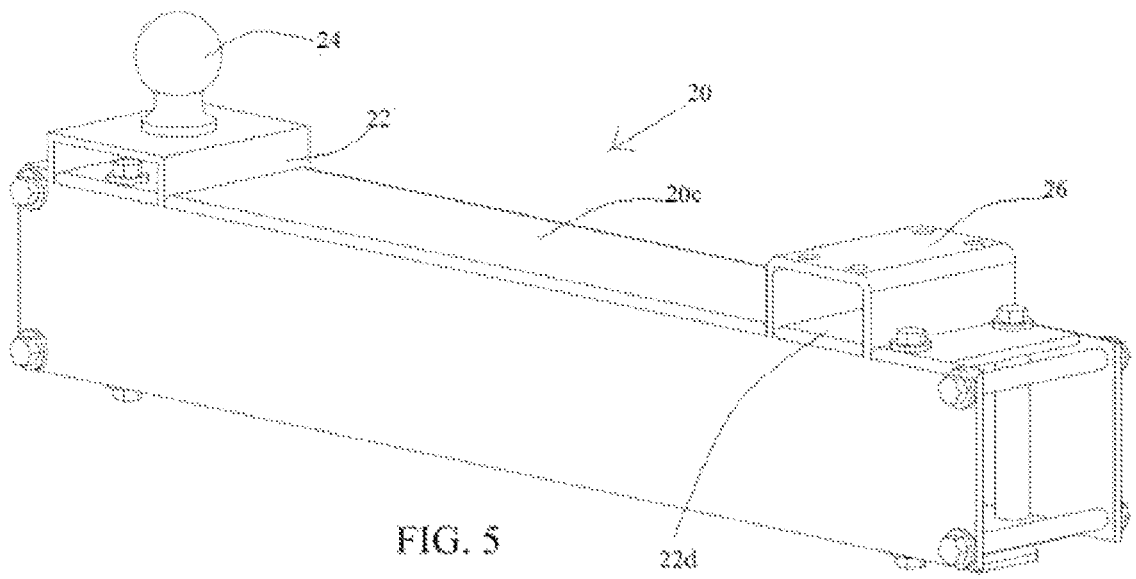
FIG. 5 shows a perspective view of the guide bar of the present invention.
Figure 6:
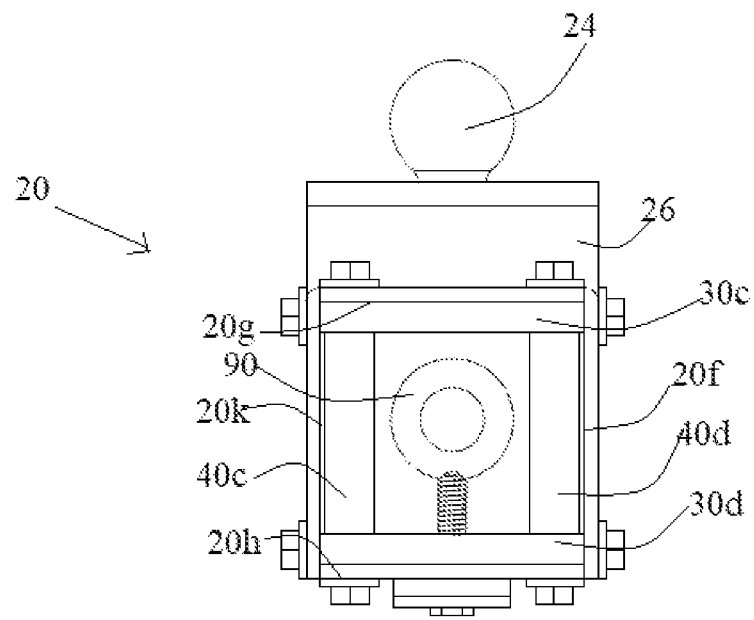
FIG. 6 shows a rear view of the guide bar of the present invention.
Figure 7:
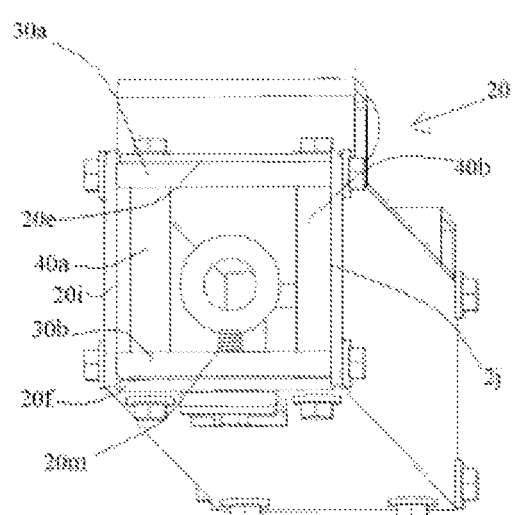
FIG. 7 shows a rear bottom perspective view of the guide bar of the present invention.
Figure 8:
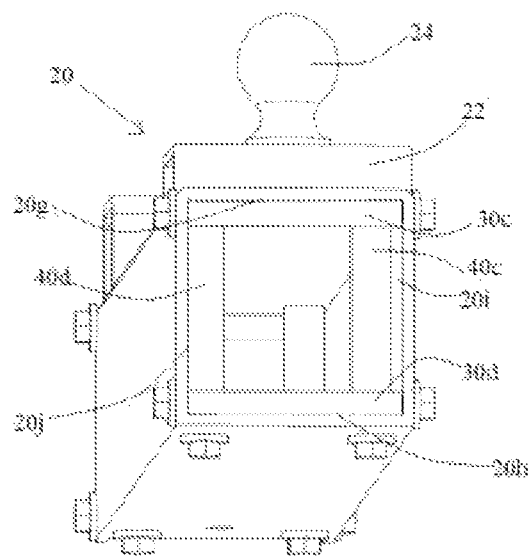
FIG. 8 shows a front bottom perspective view of the guide bar of the present invention.
Figure 9:
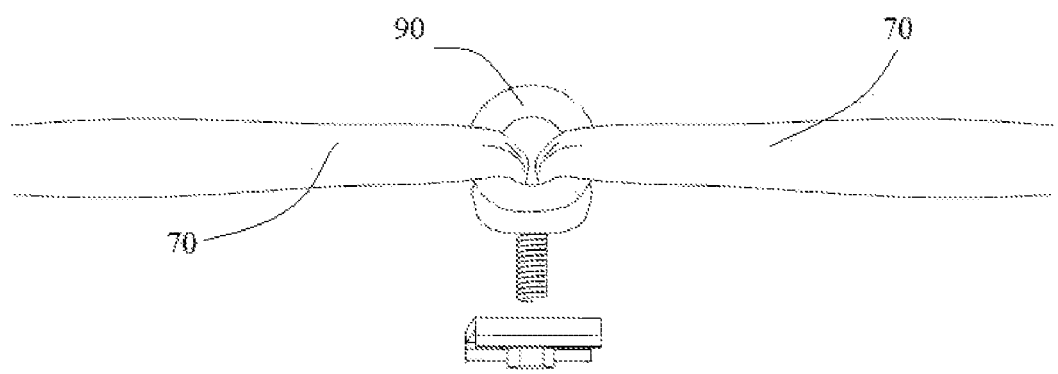
FIG. 9 shows a side view that shows how the strap of the present invention is secured to a hook.
Figure 10:
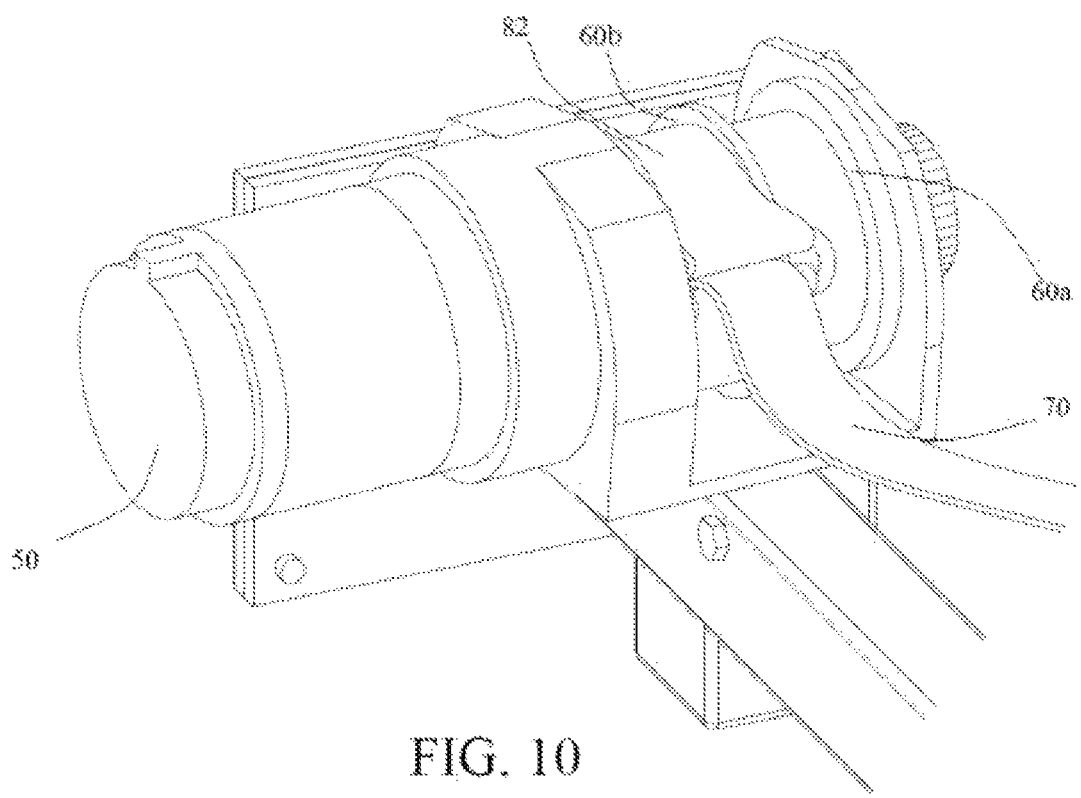
FIG. 10 shows a perspective view of the winch of the present invention that shows how the strap is secured to a first side of the double spool of the present invention.
Figure 11:
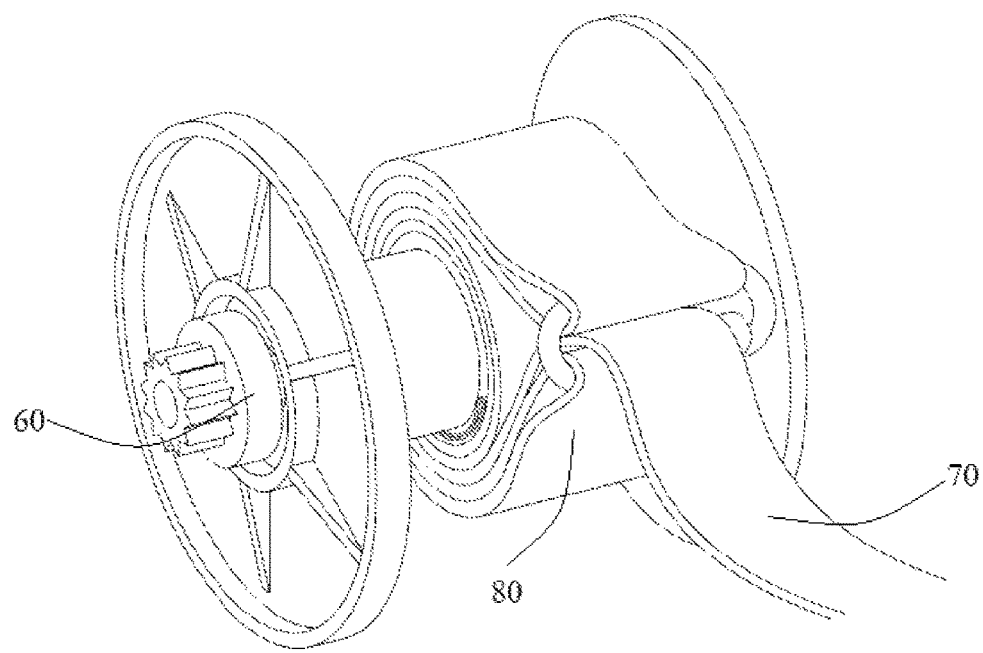
FIG. 11 shows a perspective view of the present invention that shows how the strap is secured to a second side of the double spool of the present invention.
Figure 12:
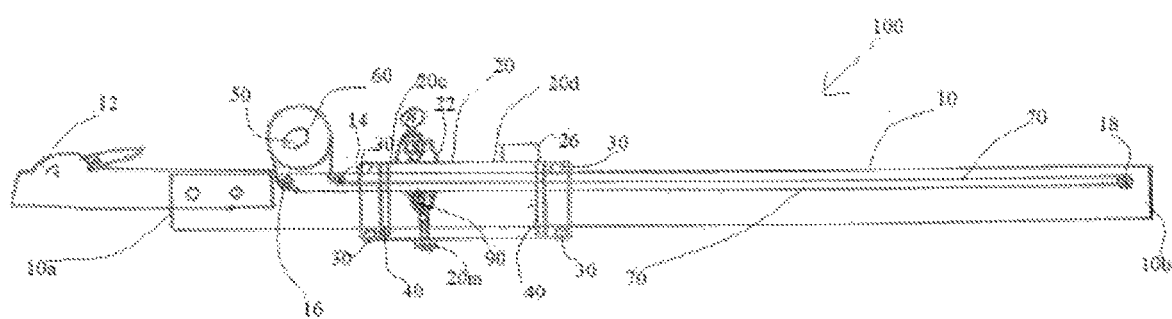
FIG. 12 shows a cross-section of the present invention.
Figure 13:
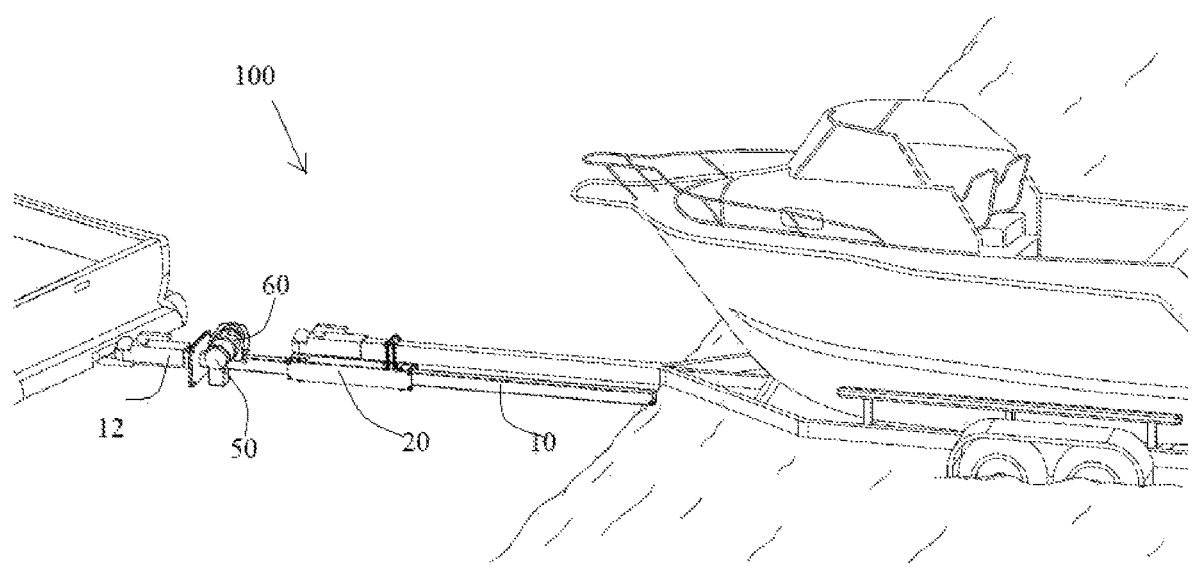
FIG. 13 show a perspective view of how a tow vehicle would unload a boat trailer onto a body of water.

As seen in FIGS. 1-13, the present invention is a boat trailer extender 100 that is used to load and unload your trailer on a boat ramp.

The boat trailer extender 100 comprises of a track bar 10 that is hollow, the track bar 10 has a first end 10a and a second end 10b, the first end 10a of the track bar 10 has a tongue 12 that is configured to attach to a ball that is mounted on a vehicle, the track bar 10 has an upper horizontal roller 14 and a lower horizontal roller 16, positioned within the track bar 10, that are at least one foot from the first end 10a, the upper horizontal roller 14 is at a greater distance from the first end 10a then the lower horizontal roller 16, the track bar 10 has a second end horizonal roller 18 that is positioned within the track bar 10 at a location that is at least four inches from the second send 10b of the track bar 10. A guide bar 20 that is hollow that has a first open end 20a and a second open end 20b, an upper side of the first end 20c of the guide bar 20 defines a first mount 22, a ball 24 is attached to the first mount 22, an upper side of the second end 20d of the guide bar 20 defines a second mount 26 that is configured to receive at least a pair of securing clamps 28 that will attach to a boat trailer bar. Four horizontal guide bar rollers 30 are attached and positioned within the guide bar 20, a first horizontal guide bar roller 30a attaches horizontally to the guide bar 20 at a position that is within and adjacent to a top inner side of the first side 20e of the guide bar 20, a second horizontal guide bar roller 30b attaches horizontally to the guide bar 20 at a position that is within and adjacent to the lower inner side of the first side 20f of the guide bar 20, a third horizontal guide bar roller 30c attaches horizontally to the guide bar 20 at a position that is within and adjacent to the top inner side of the second side 20g of the guide bar 20, a fourth horizontal guide bar roller 30d attaches horizontally to the guide bar 20 at a position that is within and adjacent to the lower inner side of the second side 20h of the guide bar 20. Four vertical guide bar rollers 40 are attached and positioned within the guide bar 20, a first vertical guide bar roller 40a attaches horizontally to the guide bar 20 at a position that is within and adjacent to a left inner side of the first side 20i of the guide bar 20, a second vertical guide bar roller 40b attaches vertically to the guide bar 20 at a position that is within and adjacent to the right inner side of the first side 20j of the guide bar 20, a third vertical guide bar roller 40c attaches vertically to the guide bar 20 at a position that is within and adjacent to the left inner side of the second side 20k of the guide bar 20, a fourth vertical guide bar roller 40d attaches vertically to the guide bar at a position that is within and adjacent to the right inner side of the second side 20l of the guide bar 20. A winch 50 that defines a double spool 60 that is attached to the upper side of the track bar 10c at a position that is at least 12 inches from the first end of the track bar 10. And, a strap 70 that is attached to the double spool 60 as follows: the strap 70 attaches to a first side 60a of the double spool 60, the strap 70 is passed through a first closed loop strap brake 80 and then is placed under the upper horizontal roller 14 of the track bar 10, then the strap is placed over the second end horizontal roller 18, then the strap 14 is secured to a hook 90 that is defined on an inner side of a first bottom end the guide bar 20m, then the strap 70 is placed under the lower horizontal roller 16 of the track guide 10, then the strap 70 is passed through a second closed loop strap brake 82, and lastly the strap 70 is secured a second side 60b of the double spool 50, the winch 50 is configured to allow the double spool 50 to move the guide bar 20 inward and outward from the first end 10a of the track guide 10.

In preferred embodiments the strap is made of a polymer. The strap 70 can be made of other materials.

In preferred embodiments of the present invention, the first closed loop strap brake 80 and the second closed loop strap brake 82 are made of polymer straps 83 that have two ends, each end of the polymer straps 83 attaches to an aluminum guide 84, the strap 70 passes through the aluminum guide 84 so that a friction is created between the polymer straps 83 of the strap brake 80 and the strap 70.

An advantage of the present invention is that it provides a boat trailer extender that allows a small boat that is placed on a boat trailer to be safely released and retracted from a body of water that is adjacent to a boat ramp.

Another advantage of the present invention is that it provides a boat trailer extender that does not corrode as quickly as other extenders in the market because of the plastic covered strap that it uses to load and unload a boat onto a body of water.

Another advantage of the present invention is that it provides a boat trailer extender that does not oxidize as quickly as other extenders in the market because of the plastic covered strap that it uses to load and unload a boat onto a body of water.

While the inventor's description contains many specificities, these should not be construed as limitations on the boat trailer extender of the present invention, but rather as an exemplification of several preferred embodiments thereof. Many other variations are possible. Accordingly. the scope should be determined not by the embodiments illustrated, but by the specification, the drawings, and the appended claims and their legal equivalents.

What is claimed, is:

1. A boat trailer extender, the boat trailer extender comprises:
    a track bar that is hollow, the track bar has a first end, and a second end, the first end of the track bar has a tongue that is configured to attach to a ball that is mounted on a vehicle, the track bar has an upper and a lower horizontal roller, positioned within the track bar, that are at least one foot from the first end, the upper horizontal roller is at a greater distance from the first end then the lower horizontal roller, the track bar has a second end horizonal roller that is positioned within the track bar at a location that is at least four inches from the second send of the track bar;
    a guide bar that is hollow that has a first open end and a second open end an upper side of the first end of the guide bar defines a first mount, a ball is attached to the first mount, an upper side of the second end of the guide bar defines a second mount that is configured to receive at least a pair of securing clamps that will attach to a boat trailer bar;
    four horizontal guide bar rollers are attached and positioned within the guide bar, a first horizontal guide bar roller attaches horizontally to the guide bar at a position that is within and adjacent to the top inner side of the first side of the guide bar, a second horizontal guide bar roller attaches horizontally to the guide bar at a position that is within and adjacent to the lower inner side of the first side of the guide bar, a third horizontal guide bar roller attaches horizontally to the guide bar at a position that is within and adjacent to the top inner side of the second side of the guide bar, a fourth horizontal guide bar roller attaches horizontally to the guide bar at a position that is within and adjacent to the lower inner side of the second side of the guide bar;
    four vertical guide bar rollers are attached and positioned within the guide bar, a first vertical guide bar roller attaches horizontally to the guide bar at a position that is within and adjacent to a left inner side of the first side of the guide bar, a second vertical guide bar roller attaches vertically to the guide bar at a position that is within and adjacent to the right inner side of the first side of the guide bar, a third vertical guide bar roller attaches vertically to the guide bar at a position that is within and adjacent to the left inner side of the second side of the guide bar, a fourth vertical guide bar roller attaches vertically to the guide bar at a position that is within and adjacent to the right inner side of the second side of the guide bar;
    a winch that defines a double spool that is attached to the upper side of the upper side of the track bar at a position that is at least 12 inches from the first end of the track bar; and
    a strap that is attached to the double spool as follows: the strap attaches to a first side of the double spool, the strap is passed through a first closed loop strap brake and then is placed under the upper horizontal roller of the track bar, then the strap is placed over the second end horizontal roller, then the strap is secured to a hook that is defined on an inner side of a first bottom end the guide bar, then the strap is placed under the lower horizontal roller of the track guide, then the strap is passed through a second closed loop strap brake, and lastly the strap is secured a second side of the double spool, the winch is configured to allow the double spool to move the guide bar inward and outward from the first end of the track guide.

2. The boat trailer extender of claim 1, wherein the strap is made of a polymer.

3. The boat trailer extender of claim 1, wherein the strap brake is made of a polymer strap that has two ends, each end of the, polymer strap attaches to an aluminum guide, the strap passes through the aluminum guide so that a friction is created between the polymer strap of the first closed loop strap brake and the strap, and so that a friction is created between the polymer strap of the second closed loop strap brake and the strap.

\* \* \* \* \*